(12) United States Patent
Lee et al.

(10) Patent No.: US 9,013,365 B2
(45) Date of Patent: Apr. 21, 2015

(54) INTERCONNECT FEED DEVICES FOR ELECTRICAL COMPONENTS, AND PROCESSES FOR MANUFACTURING SAME

(75) Inventors: Ying-Ming Lee, Melbourne, FL (US); Brinnan C. Riley, West Melbourne, FL (US); Brett Pigon, Grant-Valkaria, FL (US); William E. Clark, Palm Bay, FL (US); Steven R. Sprinkle, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 225 days.

(21) Appl. No.: 13/410,480

(22) Filed: Mar. 2, 2012

(65) Prior Publication Data
US 2013/0229323 A1    Sep. 5, 2013

(51) Int. Cl.
| | | |
|---|---|---|
| *H01Q 1/00* | (2006.01) | |
| *H02G 3/04* | (2006.01) | |
| *H01P 1/00* | (2006.01) | |
| *H01R 13/6599* | (2011.01) | |
| *H01Q 21/00* | (2006.01) | |
| *H01R 13/6473* | (2011.01) | |

(52) U.S. Cl.
CPC ....... *H01R 13/6599* (2013.01); *Y10T 29/49117* (2015.01); *H01R 13/6473* (2013.01); *H01Q 21/0006* (2013.01)

(58) Field of Classification Search
CPC ......................................................... H01P 3/06
See application file for complete search history.

(56) References Cited

U.S. PATENT DOCUMENTS

| 4,564,723 | A * | 1/1986 | Lang ............................... 174/36 |
| 4,575,330 | A * | 3/1986 | Hull ........................... 425/174.4 |
| 4,861,945 | A * | 8/1989 | Buck et al. ...................... 174/69 |
| 5,244,415 | A * | 9/1993 | Marsilio et al. .......... 439/607.47 |
| 6,473,039 | B1 | 10/2002 | Whybrew et al. |
| 6,483,464 | B2 | 11/2002 | Rawnick et al. |
| 6,831,608 | B2 * | 12/2004 | Arvidsson .............. 343/700 MS |
| 6,906,679 | B2 * | 6/2005 | Kneisel et al. ................ 343/816 |
| 7,193,578 | B1 * | 3/2007 | Harris et al. ................... 343/767 |
| 7,498,698 | B2 * | 3/2009 | Yamaguchi ................... 307/147 |
| 7,650,683 | B2 * | 1/2010 | Forster et al. .................... 29/600 |
| 7,884,768 | B2 * | 2/2011 | Navarro et al. ............... 343/702 |
| 7,948,446 | B2 * | 5/2011 | Barone ........................ 343/900 |
| 7,989,701 | B2 * | 8/2011 | Kosaka et al. ............. 174/110 R |
| 8,059,057 | B2 * | 11/2011 | Mason et al. ................. 343/853 |
| 2006/0291407 | A1* | 12/2006 | Johnson et al. ............... 370/294 |
| 2012/0025928 | A1* | 2/2012 | Crouch ......................... 333/125 |

* cited by examiner

*Primary Examiner* — Dameon E Levi
*Assistant Examiner* — Ricardo Magallanes
(74) *Attorney, Agent, or Firm* — Robert J. Sacco, Esq.; Fox Rothschild LLP (57) ABSTRACT

Interconnect feed devices (10) are provided for electrically connecting first and second electrical components (17, 21). The interconnect feed devices (10) can include a dielectric shell (23) with an electrically-conductive coating (40), and leads (22) positioned within individual conduits (30) of the shell. Each lead (22) and its associated conduit (30) can act as a coaxial cable for transmitting radio frequency (RF) energy between the first and second electrical components (17, 21). The shell (23) can be manufactured using a process, such as stereolithography, that allows the shell to be formed with relatively complicated geometries, which in turn can facilitate relatively complicated cable routing.

18 Claims, 7 Drawing Sheets

INTERCONNECT FEED DEVICES FOR ELECTRICAL COMPONENTS, AND PROCESSES FOR MANUFACTURING SAME

GOVERNMENT CONTRACT

This invention was made with Government support under N00019-10-C-0070 awarded by the U.S. Navy. The Government has certain rights in this invention.

BACKGROUND OF THE INVENTION

1. Statement of the Technical Field

The inventive arrangements relate to interconnect feed devices for transmitting radio frequency (RF) energy between two or more electrical components, such as but not limited to an antenna element unit and associated transmit/receive electronics of a phased-array antenna system.

2. Description of Related Art

Many types of electronic devices require the transmission of RF energy between two or more components thereof. For example, in phased-array antenna systems, RF signals are transmitted between an array antenna having a plurality of antenna element units that radiate and receive RF energy, and transmit/receive electronics that transmit and receive the outgoing and incoming RF signals. Transmission and reception of the RF signals is accomplished via an interconnecting feed commonly comprising coaxial cables.

In some types of phased-array antenna systems, each antenna element unit may include as many as four constituent radiating feed arms that each require an RF signal path to an associated set of transmit/receive electronics. These signal paths need to be of substantially the same length, to maintain the RF signals in phase as they travel between the transmit/receive electronics and the antenna element unit. Also, the interface location points for the feed on the transmit/receive electronics are often arranged in a linear pattern, while the interface locations on the antenna element unit are arranged in a diagonal or square pattern. Thus, maintaining signal paths of substantially equal length in the feed often requires complex and precise cable routing to transition between the interface locations. The expense and time needed to construct a feed using such routing can be substantial. In fact, the combined cost of the feeds in a typical phased-array antenna system can represent between 20 to 30 percent of the overall cost of the antenna element array.

SUMMARY OF THE INVENTION

The invention concerns interconnect feed devices for electrically connecting a first and a second electrical component. The interconnect feed devices include two or more electrically-conductive leads, and a rigid or semi-rigid, dielectric, unitary shell having two or more individual tubular conduits each having an internal passage extending therethrough. Each of the passages has an associated one of the leads positioned therein. The interconnect feed devices further include an electrically-conductive coating disposed on the exterior surface of the shell. Each of the conduits, the associated lead positioned within the conduit, and the coating form a coaxial transmission path operative to transmit radio frequency energy between the first and a second electrical components.

The invention also concerns phased-array antenna systems which include an antenna element array comprising two or more antenna elements operative to radiate and receive radio-frequency energy. Two or more sets of transmit/receive electronics are also provided, and are operative to process the radio frequency energy radiated and received by the antenna elements. Two or more interconnect feed devices are respectively electrically connected to an associated one of the antenna elements and an associated one of the sets of transmit/receive electronics. The interconnect feed devices include two or more electrically-conductive leads, and a rigid or semi-rigid, dielectric, unitary shell having two or more individual tubular conduits each having an internal passage extending therethrough. Each of the passages has an associated one of the leads positioned therein. The interconnect feed devices further include an electrically-conductive coating disposed on the exterior surface of the shell. The conduits, the associated leads positioned within the conduits, and the coatings form coaxial transmission paths operative to transmit radio frequency energy between the first and second electrical components.

According to another aspect, the invention includes a process for manufacturing interconnect feed devices for electrically connecting first and second electrical components. The process includes unitarily forming a dielectric shell having two or more individual tubular conduits each having an internal passage extending therethrough, applying an electrically-conductive coating to the shell, and inserting electrically-conductive leads into each of the passages.

BRIEF DESCRIPTION OF THE DRAWINGS

Embodiments will be described with reference to the following drawing figures, in which like numerals represent like items throughout the figures and in which.

DETAILED DESCRIPTION

The invention is described with reference to the attached figures. The figures are not drawn to scale and they are provided merely to illustrate the current invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The invention is not limited by the illustrated ordering of acts or events, as some acts may occur in different orders and/or concurrently with other acts or events. Furthermore, not all illustrated acts or events are required to implement a methodology in accordance with the invention.

Figure 5:
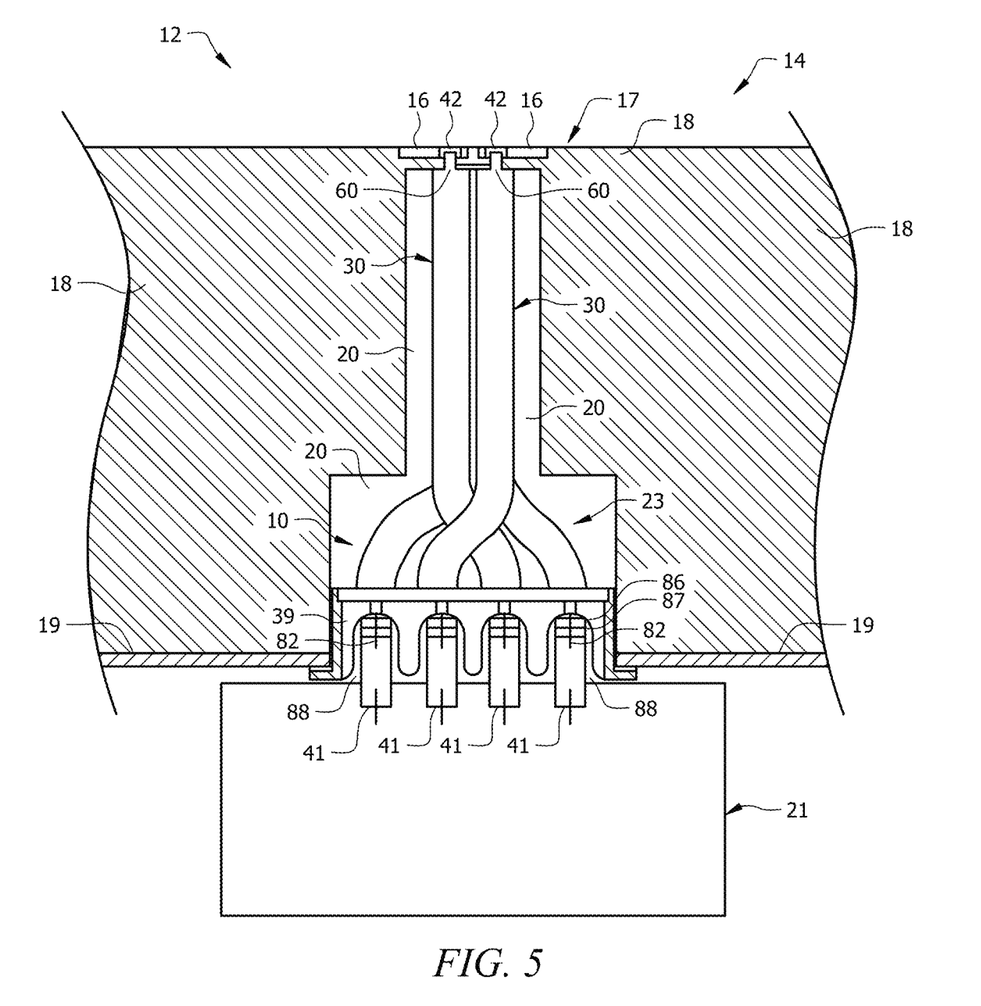
FIG. 5 is a side view of a phased-array antenna system incorporating the interconnect feed device shown in FIGS. 1-4, depicting a substrate of the phased-array antenna system and a housing of the interconnect feed device in cross-section.

The figures depict an interconnect feed device 10. The interconnect feed device 10 can be used, for example, as part of a phased-array antenna system 12, depicted in FIG. 5. The phased-array antenna system 12 includes an antenna element array comprising a plurality of antenna element units 14 (only one of the antenna element units 14 is depicted in FIG. 5, for clarity of illustration). Each antenna element unit 14 can include four feed arms 16 (only two of the feed arms 16 are visible in FIG. 5). Each antenna element unit 14 can also include a substrate 17 comprising a dielectric layer 18, and a ground plane 19 fixed to the underside the dielectric layer 18. The feed arms 16 are mounted on the upper surface of the dielectric layer 18, as shown in FIG. 5. A plurality of feed structures 20, each associated with a respective one of the feed arms 16, are formed in the substrate 17.

The phased-array antenna system 12 also includes a plurality of sets of transmit/receive electronics 21, shown in FIG. 5. Only one of the sets of transmit/receive electronics 21 is depicted in FIG. 5, for clarity of illustration. Each of the sets of transmit/receive electronics 21 is electrically connected to an associated one of the feed arms 16 by one of the interconnect feed devices 10. The interconnect feed device 10 transmits or feeds RF energy between the transmit/receive electronics 21 and the antenna element unit 14.

Figure 6:
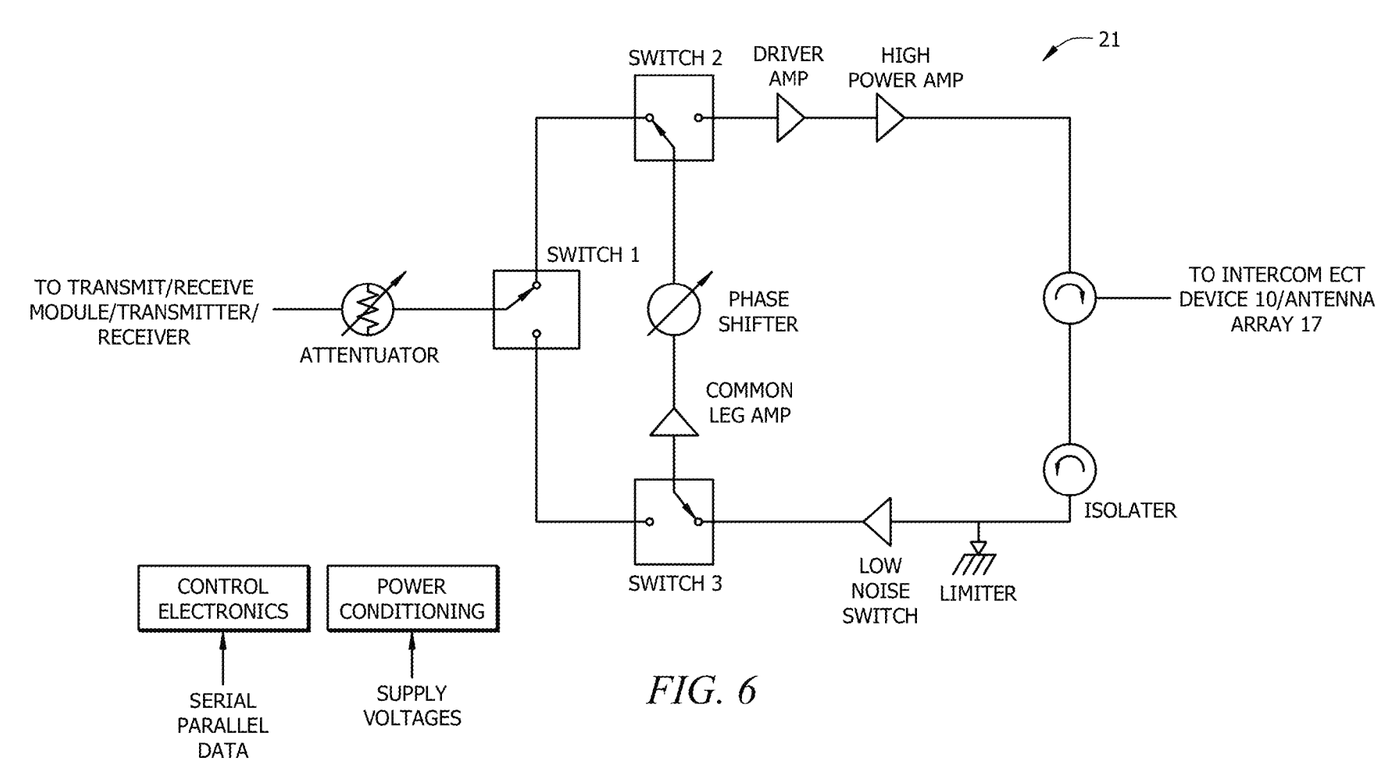
FIG. 6 is a schematic illustration of a set of transmit/receive electronics of the phased-array antenna system shown in FIG. 5.

FIG. 6 is a schematic illustration of one possible configuration for each set of transmit/receive electronics 21. This particular configuration is disclosed for exemplary purposes only. The transmit/receive electronics 21 can have other configurations in alternative embodiments of the phased-array antenna system 12.

Figure 4:
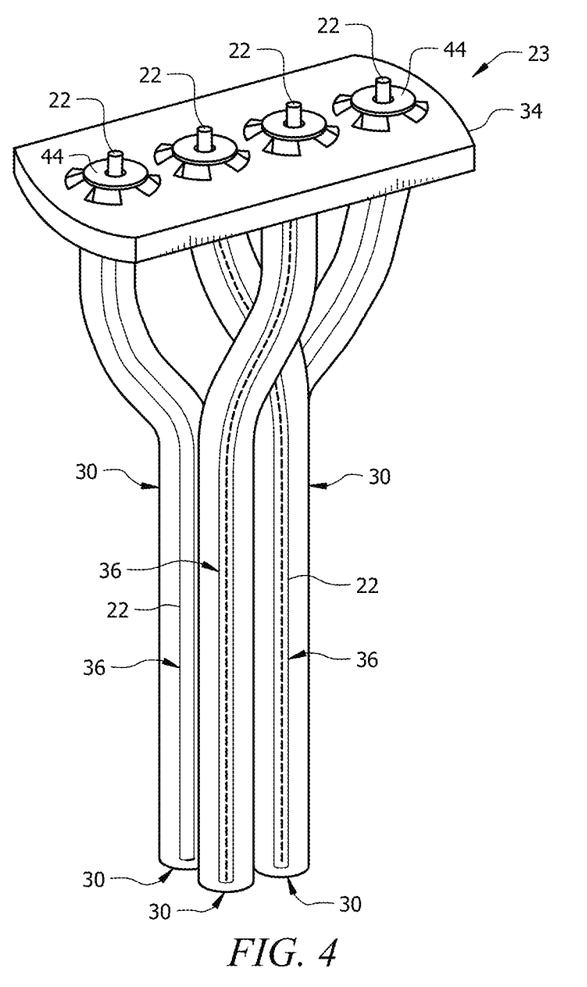
FIG. 4 is a top perspective view of a shell of the interconnect feed device shown in FIGS. 1-3, with electrically-conductive leads installed therein and depicting portions of the leads and internal passages of the shell in phantom.

The interconnect feed devices 10 each comprise a rigid or semi-rigid shell 23, shown in FIGS. 1-5. The shell 23 can be formed from a low dielectric thermosetting material such as DSM Somos NANOTOOL resin. Each interconnect feed device 10 also comprises four bare, i.e., non-insulated, electrically-conductive leads 22 housed in the shell 23, as shown in FIG. 4. Each lead 22 can be, for example, a 0.018-inch diameter strand of copper wire or other suitable conductor, with the diameter selected to provide the desired transmission impedance in concert with the dielectric shell 23 and an electrically-conductive coating 40 disposed on the exterior surface of the shell 23.

The shell 23 includes four tubular conduits 30, each having an internal passage 36 formed therein. Each internal passage 36 extends the length of the conduit 30, and accommodates an associated lead 22 as depicted in FIG. 4. The diameter of the passages 36 is slightly greater than the diameter of the leads 22, so that each lead 22 is positioned snugly within its associated passage 36. Alternative embodiments of the shell 23 can include less, or more than four conduits 30.

The shell 23 is preferably unitary, meaning that the shell 23 is formed unitarily or integrally so that the conduits 30 are a single, integrally formed piece. The shell 23 can be formed using a suitable process such as stereolithography or molding.

Figure 7:
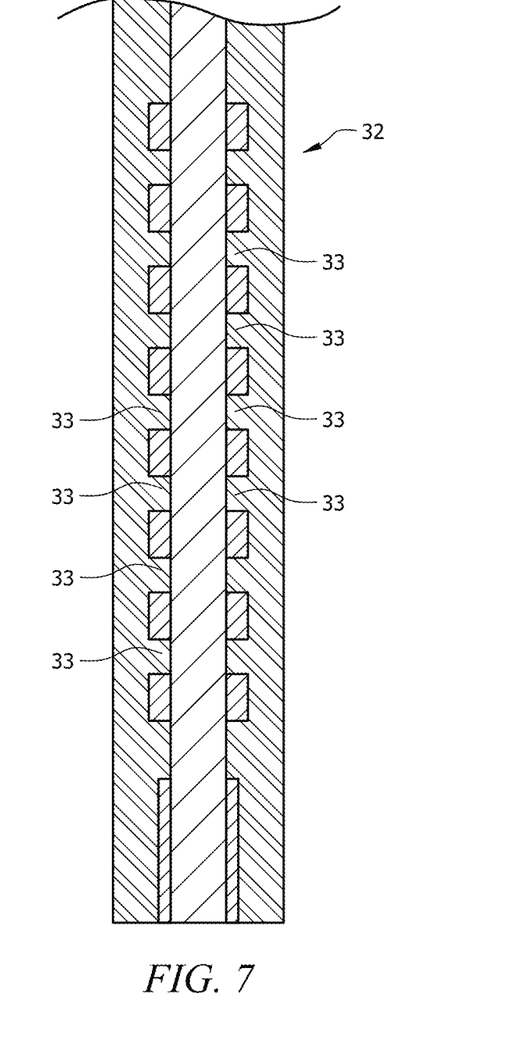
FIG. 7 is a cross-sectional view of a conduit of an alternative embodiment of the shell of the interconnect feed device shown in FIGS. 1-5.

The interior surfaces of the conduits 30 that form the passages 36 are substantially smooth and continuous, as shown in FIG. 4. FIG. 7 depicts an alternative embodiment of the conduits 36 in the form of a conduit 32. The interior of each conduit 32 can include a series of circumferentially-extending ribs 33. This configuration, which results in a greater amount of air being located between the conduit 32 and its associated lead 22 in comparison to the conduit 30, can be used to vary the effective dielectric constant of the shell 23 for impedance-matching purposes, or to reduce ohmic losses due to the dielectric material properties.

The shell 23 also includes an end plate 34 that adjoins a first end of each of conduit 30, as shown in FIGS. 1-5. The end plate 34 has four through holes formed therein. Each of the through holes adjoins an associated passage 36 of one of the conduits 30, so that the leads 22 can extend through the end plate 34 by way of the passages 36.

Figure 1:
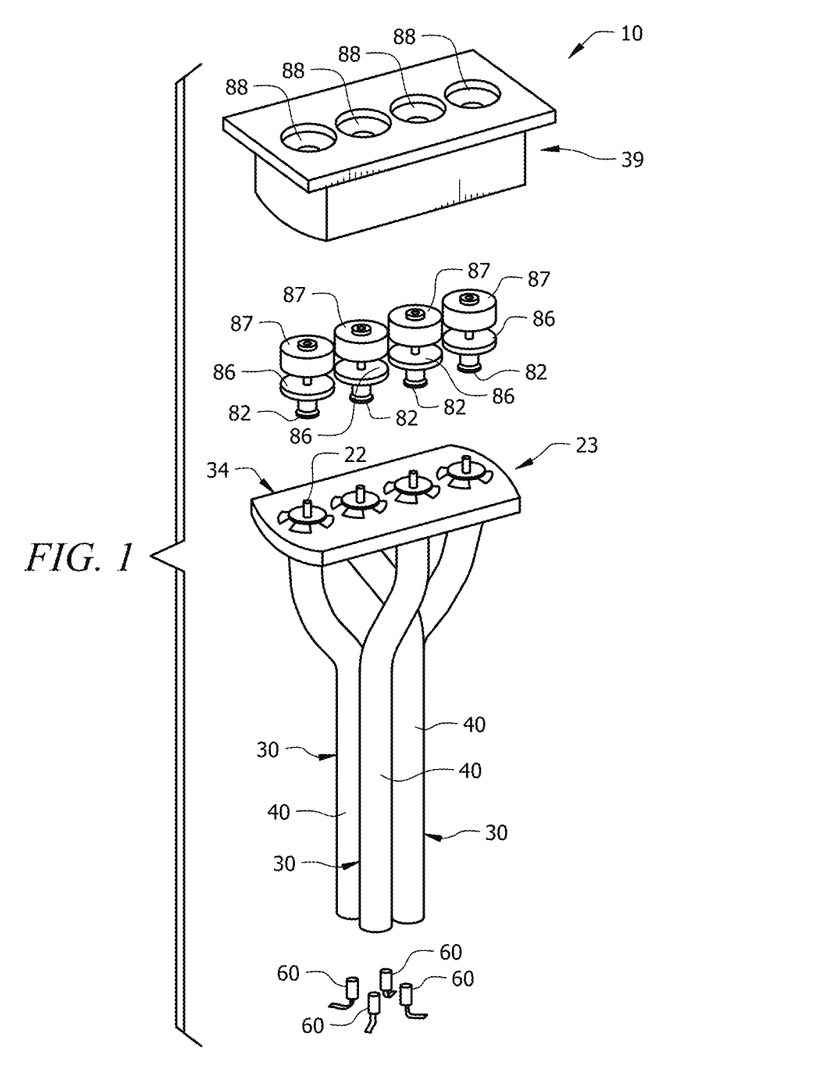
FIG. 1 is an exploded, top perspective view of an interconnect feed device.
Figures 2, 3:
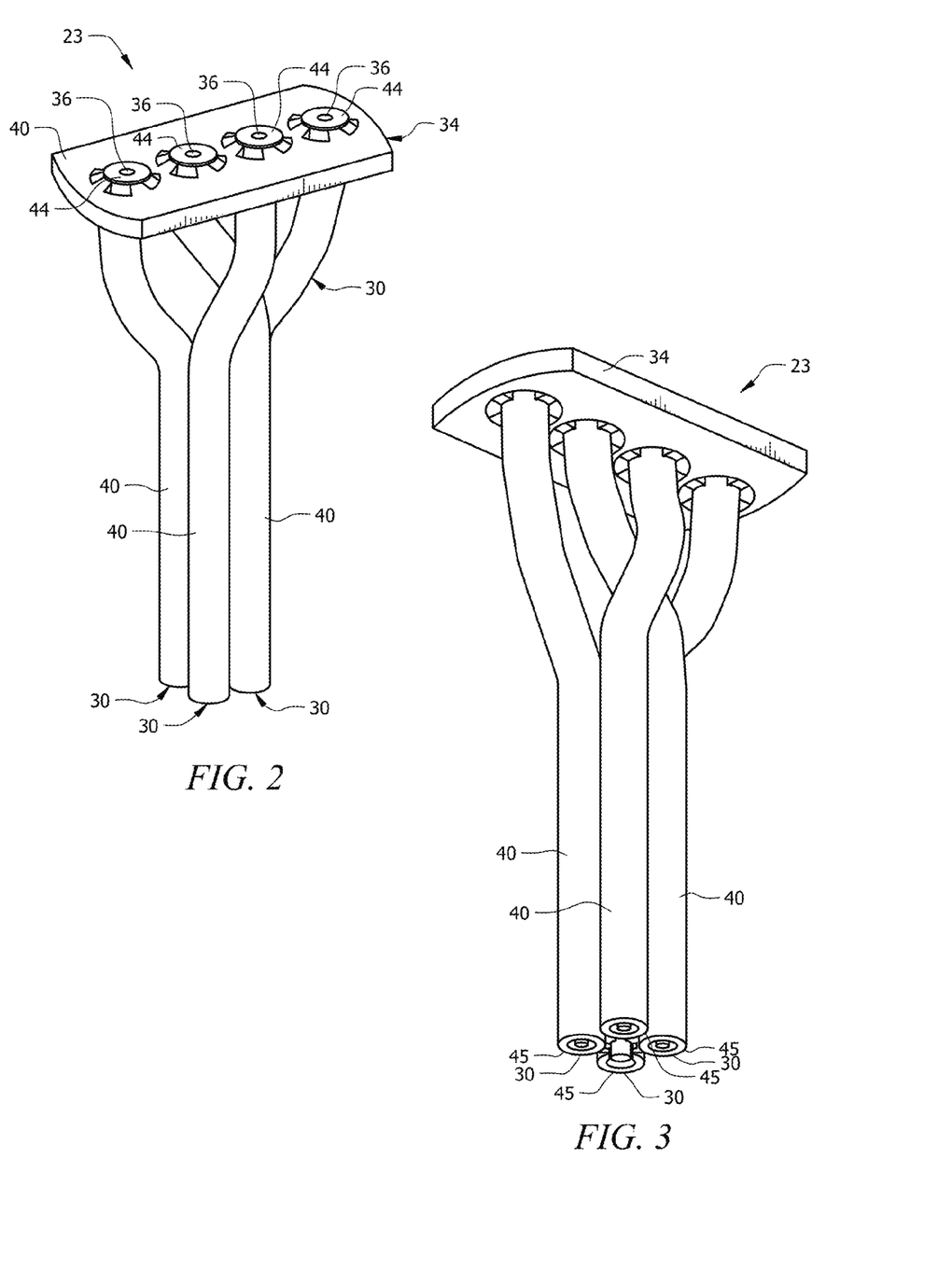
FIG. 2 is a top perspective view of a shell of the interconnect feed device shown in FIG. 1.
FIG. 3 is a bottom perspective view of the shell of the interconnect feed device shown in FIGS. 1 and 2.

The electrically-conductive coating 40 on the exterior surface of the shell 23 can be, for example, nickel plating with a copper underlay. The coating 40 covers the exterior surface of the shell 23 in its entirety, with the following exceptions. The coating 40 is not applied to a substantially circular area 44 surrounding the end point of each passage 36 on the outwardly-facing major surface of the end plate 34, as shown in FIGS. 1, 2, and 4. The coating 40 likewise is not applied to the end face 45 of a second end of each conduit 30, as illustrated in FIG. 3. These uncoated surface portions 44, 45 of the shell 23 thus remain electrically insulative.

Each interconnect feed device 10 further includes a metallic housing 39, shown in FIGS. 1 and 5. The housing 39 covers the end plate 34, and is secured to the end plate 34 by a suitable means such as an interference fit or fasteners.

Each conduit 30 and its associated lead 22 act as a coaxial cable. In particular, the lead 22 conducts RF signals between the associated feed arm 16 and transmit/receive electronics 21, the coating 40 on the conduit 30 acts as a ground shield, and the conduit 30 functions as a dielectric between the signals and the ground shield.

Each set of transmit/receive electronic 21 includes four blind mateable connectors 41 that form the interface between the transmit/receive electronics 21 and its associated interconnect feed device 10. The connectors 41 may be arranged in an in-line pattern, as depicted in FIG. 5. The conduits 30 of each interconnect feed device 10 are arranged in a similar in-line pattern at a first end thereof, as illustrated in FIG. 3, so that each of the passages 36 in the end plate 34 substantially aligns with an associated one of the connectors 41 when the interconnect feed device 10 is mated with the transmit/receive electronics 21, as shown in FIG. 5.

Each of the feed arms 16 has four contacts 42 associated therewith. The contacts 42 are arranged in a diagonal, or square pattern on the circuit board 18. The conduits 30 of each interconnect feed device 10 are arranged in a diagonal or square pattern at a second end thereof, as shown for example in FIG. 3, so as to match the pattern of the contacts 42. The second ends of the conduits 30, and the housing 39 of each interconnect feed device 10 fit within an associated one of the feed structures 20 of the substrate 17 as illustrated in FIG. 5, so that the interconnect feed device 10 interfaces with its associated antenna element unit 14 from the underside of the substrate 17.

The geometry of the shell 23 is dependent upon the configuration of the connection points on the components being electrically connected by the interconnect feed device 10. Thus, the ends of the conduits 30 can be arranged in patterns other than linear and square patterns in alternative embodiments of the shell 23.

The RF signals input to each interconnect feed device 10 from its associated transmit/receive electronics 21 are in phase as they enter the interconnect feed device 10. The conduits 30 of each interconnect feed device 10 are shaped so that the lengths of the four conduits 30, and their associated internal passages 32, are substantially identical, as shown in FIG. 4. This feature permits the leads 22 to be of substantially identical length. The substantially equal length of the leads 22, in turn, helps to maintain the RF signals in phase as the signals are transmitted through the interconnect feed device 10, so that the signals are in phase when they reach the associated feed arm 16.

Each interconnect feed device 10 can further include four contacts that form the electrical interface between the interconnect feed device 10 and its associated antenna element unit 14. The contacts can be, for example, pins 60 as illustrated in FIGS. 1 and 5. Each lead 22 terminates before reaching the end of its associated passage 36, so that an associated pin 60 can be accommodated in the end of the passage 36. Each pin 60 is sized to fit snugly within the end of the passage 36, so that an end portion of the pin 60 contacts the associated lead 22, and the other end portion extends out of the second end of the conduit 30. The second end of each pin 60 can engage an associated feed arm 16 by way of a through hole formed in the dielectric layer 18, as depicted in FIG. 5.

The interconnect feed devices 10 can each include four connectors that form the electrical interface between the leads 22 and the connectors 41 on the associated transmit/receive electronics 21. The connectors can be, for example, nail head pin connectors 82, as depicted in FIGS. 1 and 5. The connectors 82 are positioned within the housing 39, so that a first end of each connector 82 abuts one of the uncoated areas on the end plate 34. The leads 22 can be configured so that an end of each lead 22 extends out of its passage 36 in the end plate 34, and is received through the first end the associated connector 82.

Each pin connector 82 can be held within the housing 39 by an electrically-insulative washer 86 and a TEFLON insert 87 that are positioned around the connector 82, and fit snugly in openings or depressions 88 formed in the housing 39 as shown in FIGS. 1 and 5. A second end of each connector 82 is received within an associated one of the connectors 41 on the associated transmit/receive electronics 21 when the interconnect feed device 10 is mated with the transmit/receive electronics 21.

Specific details of the connecting means between the interconnect feed devices 10, the transmit/receive electronic channels 21, and the antenna element units 14 are provided for exemplary purposes only. Other suitable connecting means can be used in alternative embodiments.

As discussed above, the shell 23 can be integrally formed using a process such as stereolithography. Stereolithography techniques are well known in the art and therefore will not be described here in detail. However, in accordance with stereolithography process, a three-dimensional virtual model of the shell 23 can be created using computer-aided design (CAD) software. The virtual model can be segregated into thin layers, with each layer being a cross-section of the shell taken transverse to the lengthwise direction of the shell, i.e., transverse to the direction in which the conduits 30 generally extend. Each layer can have a thickness of, for example, approximately 0.05 mm (0.002") to approximately 0.15 mm (0.006").

The physical shell 23 can be formed based on the layered model, using a stereolithography apparatus (SLA) (not shown). The SLA can include a tank of liquid, ultraviolet (UV)-curable, thermosetting resin. The SLA can also include a perforated elevator platform that can be immersed in the resin, a UV laser, and a controller.

The SLA forms the shell 23 one layer at a time based on the virtual model. In particular, the laser, in response to inputs from the controller, "paints" or traces a particular cross-sectional layer of the shell across the surface of the resin, above the elevator platform. Exposure to the laser cures and solidifies the resin in the pattern traced by the laser, thereby forming a layer of the shell 23.

The elevator platform of the SLA subsequently descends by a distance approximately equal to the thickness of the layers in the virtual model, and the laser traces the next layer directly above the previously-formed layer so that the new layer is formed on top of the previously-formed layer. This process is repeated until all of the layers of the shell 23 have been formed. The shell 23 can subsequently be exposed to ultraviolet radiation to complete the cure of the liquid material.

The above details of a stereolithographic process are presented for exemplary purposes only. The shell 23 can be formed using variants of this process, and using processes other than stereolithography.

The coating 40 can be applied to the shell 23, and the leads 22 can be inserted into their associated passages 36 in the conduits 30 after the shell 23 has cured. The pins 60 can be inserted into their associated passages 36 at the second ends of the conduits 30, and the housing 39 and connectors 82 can be installed on the plate member 34 to complete the interconnect feed device 10.

The interconnect feed device 10 can thus be assembled relatively quickly, and with minimal effort. Moreover, the use of stereolithography to manufacture the shell 23 permits the relatively complicated geometry of the shell 23 to be formed to precise tolerances, in a relatively short amount of time, and at relatively low cost. Also, because complicated, precise geometries for the shell 23 can be achieved through the stereolithography process, the interconnect feed device 10 can be used to facilitate complicated and precise routing of RF signals.

Figure 8:
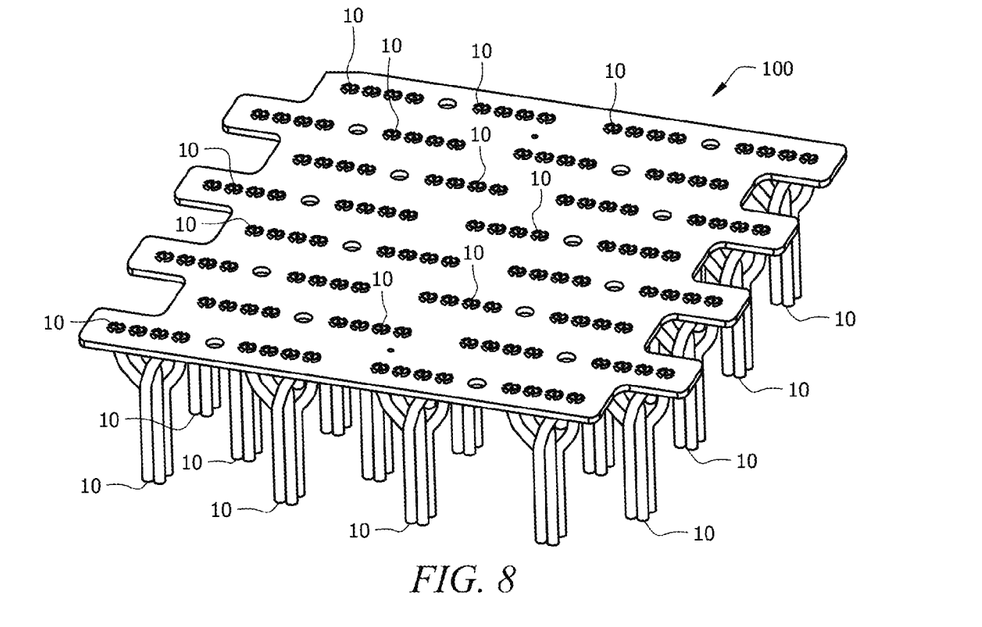
FIGS. 8 and 9 are top and bottom perspective views, respectively, of an integrally-formed array of multiple ones of the interconnect feed device shown in FIGS. 1-5.
Figure 9:
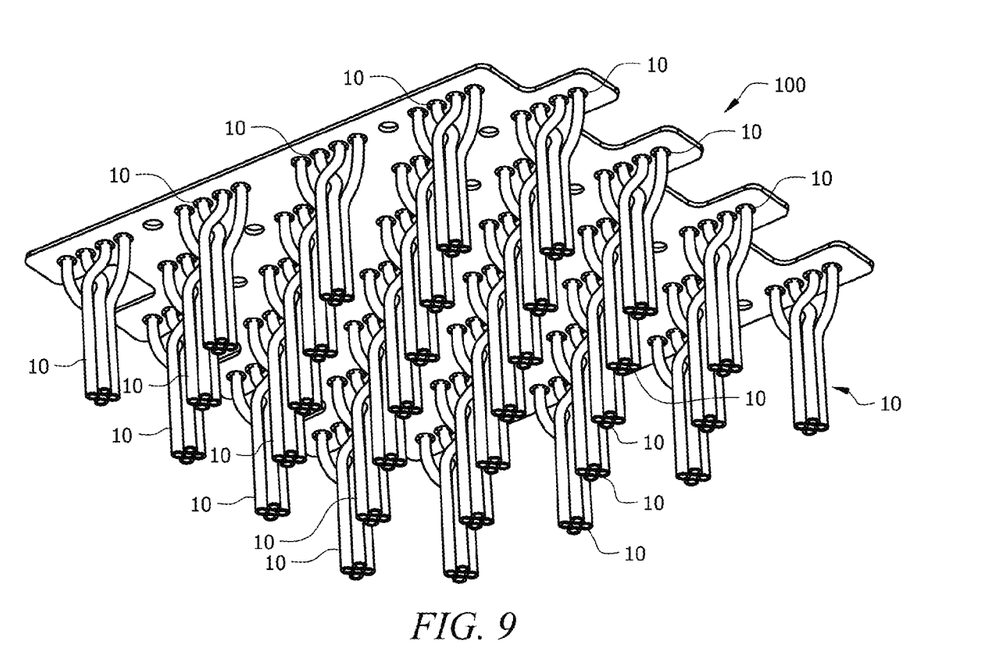

Moreover, since the stereolithography process is scalable, multiple adjoining shells 23 can be produced simultaneously. For example, FIGS. 8 and 9 depict an integrally-formed array 100 comprising multiple shells 23.

The use of the interconnect feed device 10 as part of the phased-array antenna system 12 has been described for exemplary purposes only. The interconnect feed device 10, and variants thereof, can be used in other applications requiring point to point distribution of RF energy, such as in coaxial cable arrays for interconnect boards.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All of the apparatus, methods and algorithms disclosed and claimed herein can be made and executed without undue experimentation in light of the present disclosure. While the invention has been described in terms of preferred embodiments, it will be apparent to those of skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those skilled in the art are deemed to be within the spirit, scope and concept of the invention as defined.

We claim:

1. An interconnect feed device for electrically connecting a first electrical component and a second electrical component, comprising:
   a plurality of electrically-conductive leads which are each entirely non-insulated;
   a rigid or semi-rigid dielectric shell comprising a single piece in which a plurality of individual tubular conduits and an end plate have been integrally formed,
      said plurality of individual tubular conduits comprising separate and distinct physical structures that are spaced apart along entire lengths thereof,
      each individual tubular conduit having an internal passage extending therethrough with a series of circumferentially-extending ribs, each said circumferentially-extending rib having an inner diameter larger than outer diameters of the electrically conductive leads,
      each of the internal passages having an associated lead of the electrically-conductive leads positioned therein, and
      said end plate disposed at an end of the shell and retaining the plurality of electrically-conductive leads passing through apertures formed therein so as to cause each lead of the electrically-conductive leads to be circumferentially spaced apart from at least a portion of an inner surface of a respective conduit of the plurality of individual tubular conduits that is defined at least partially by the circumferentially-extending ribs, whereby a fluid is located between the lead and the respective conduit; and
   an electrically-conductive coating disposed on an exterior of the shell and electrically isolated from all of the electrically-conductive leads, wherein each of the individual tubular conduits, the associated lead positioned within the individual tubular conduit, and the coating form a transmission path operative to transmit radio frequency energy between the first and second electrical components.

2. The interconnect feed device of claim 1, wherein the shell comprises a thermosetting material.

3. The interconnect feed device of claim 1, wherein the passages are of substantially equal length.

4. The interconnect feed device of claim 3, wherein each of the individual tubular conduits has a first and a second end, the first ends of the individual tubular conduits are positioned substantially in an in-line pattern, and the second ends of the individual tubular conduits are positioned substantially in a square pattern.

5. The interconnect feed device of claim 4, wherein the end plate adjoins the first ends of the individual tubular conduits, and has a plurality of through holes through which the electrically-conductive leads pass.

6. The interconnect feed device of claim 4, further comprising a plurality of electrically-conductive pins, each being disposed in part within an associated one of the internal passages at the second end of a respective one of the plurality of individual tubular conduits.

7. The interconnect feed device of claim 5, further comprising a metallic housing mounted on the end plate.

8. The interconnect feed device of claim 7, further comprising a plurality of electrical connectors mounted in the metallic housing and each receiving an associated one of the electrically-conductive leads.

9. A phased-array antenna system, comprising:
   an antenna element array comprising a plurality of feed arms operative to radiate and receive radio-frequency energy;
   a plurality of transmit/receive electronic channels operative to transmit and receive the radio frequency energy radiated and received by the feed arms; and
   a plurality of interconnect feed devices electrically connected to the feed arms and the transmit/receive electronic channels, wherein each of the interconnect feed devices comprises:
      a plurality of electrically-conductive leads which are each entirely non-insulated;
      a rigid or semi-rigid dielectric shell comprising a single piece in which a plurality of individual tubular conduits and an end plate have been integrally formed,
         said plurality of individual tubular conduits comprising separate and distinct physical structures that are spaced apart along entire lengths thereof,
         each individual tubular conduit having an internal passage extending therethrough with a series of circumferentially-extending ribs, each said circumferentially-extending rib having an inner diameter larger than outer diameters of the electrically conductive leads,
         each of the internal passages having an associated one of the electrically-conductive leads positioned therein,
         said end plate disposed at an end of the shell and retaining the plurality of electrically-conductive leads passing through apertures formed therein so as to cause each lead of the electrically-conductive leads to be circumferentially spaced apart from at least a portion of an inner surface of a respective conduit of the plurality of individual tubular conduits that is defined at least partially by the circumferentially-extending ribs, whereby a fluid is located between the lead and the respective conduit; and
      an electrically-conductive coating disposed on an exterior of the shell and electrically isolated from all of the electrically-conductive leads, wherein the individual tubular conduits, the associated leads positioned within the individual tubular conduits, and the coatings form transmission paths operative to transmit radio frequency energy between the feed arms and the transmit/receive electronic channels.

10. The system of claim 9, wherein the passages are of substantially equal length.

11. The system of claim 9, wherein:
   each of the transmit/receive electronic channels comprises a plurality of connectors operative to form an electrical connection between the transmit/receive electronic channels and the interconnect feed devices;
   the connectors are positioned substantially in an in-line pattern;
   first ends of the individual tubular conduits of the interconnect feed devices are positioned substantially in an in-line pattern that substantially matches the pattern of the connectors;
   each of the feed arms of the antenna element array comprises a plurality of contacts, the contacts being operative to form electrical connections between the feed arms and the interconnect feed devices;
   the contacts on each of the feed arms are positioned substantially in a square pattern; and second ends of the individual tubular conduits of the interconnect feed devices are positioned substantially in a square pattern that substantially matches the pattern of the contacts.

12. The system of claim 11, wherein the end plate adjoins the first ends of the individual tubular conduits, and has a plurality of through holes formed therein, each of the through holes adjoining an associated one of the internal passages in the individual tubular conduits.

13. The system of claim 11, wherein each of the interconnect feed devices further comprises a plurality of electrically-conductive pins, each of the electrically-conductive pins being disposed in part within an associated one of the passages at the second end of the associated individual tubular conduit and contacting an associated one of the feed arms.

14. A process for manufacturing an interconnect feed device for electrically connecting a first and a second electrical component, comprising:
    forming a rigid or semi-rigid dielectric shell comprising a single piece in which a plurality of individual tubular conduits and an end plate have been integrally formed, said plurality of individual tubular conduits comprising separate and distinct physical structures that are spaced apart along entire lengths thereof,
    each individual tubular conduit having an internal passage extending therethrough with a series of circumferentially-extending ribs, each said circumferentially-extending rib having an inner diameter larger than outer diameters of electrically conductive leads which will be respectively positioned therein;
    applying an electrically-conductive coating to the shell so as to ensure that the electrically-conductive leads will be electrically isolated therefrom when respectively inserted into the internal passages;
    inserting the electrically-conductive leads respectively into each of the internal passages, wherein each electrically-conductive lead is non-insulated; and
    coupling an end plate to an end of the shell so as to cause each lead of the electrically-conductive leads to be circumferentially spaced apart from at least a portion of an inner surface of a respective conduit of the plurality of individual tubular conduits that is defined at least partially by the circumferentially-extending ribs, whereby a fluid is located between the lead and the respective conduit.

15. The process of claim 14, wherein the shell is formed by stereolithography.

16. The process of claim 14, wherein the rigid or semi-rigid, dielectric shell is formed so that the internal passages are of substantially equal length.

17. The process of claim 16, wherein the rigid or semi-rigid, dielectric shell is formed so that first ends of the individual tubular conduits are positioned substantially in an in-line pattern, and second ends of the individual tubular conduits are positioned substantially in a square pattern.

18. The process of claim 14, wherein the end plate adjoins first ends of the individual tubular conduits and includes passages for receiving portions of the electrically-conductive leads.

* * * * *